(12) United States Patent
Schoubye et al.

(10) Patent No.: US 9,776,133 B2
(45) Date of Patent: Oct. 3, 2017

(54) CATALYST FOR THE OXIDATION OF SULFUR COMPOUNDS

(71) Applicant: Haldor Topsøe A/S, Kgs. Lyngby (DK)

(72) Inventors: Peter Schoubye, Hørsholm (DK); Joakim Reimer Thøgersen, Virum (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 15/037,718

(22) PCT Filed: Nov. 28, 2014

(86) PCT No.: PCT/EP2014/075963
§ 371 (c)(1),
(2) Date: May 19, 2016

(87) PCT Pub. No.: WO2015/082352
PCT Pub. Date: Jun. 11, 2015

(65) Prior Publication Data
US 2016/0296889 A1  Oct. 13, 2016

(30) Foreign Application Priority Data

Dec. 2, 2013 (EP) .................................... 13195222
Dec. 2, 2013 (EP) .................................... 13195223

(51) Int. Cl.
| | |
|---|---|
| *B01D 53/48* | (2006.01) |
| *B01D 53/86* | (2006.01) |
| *C01B 17/48* | (2006.01) |
| *C01B 17/50* | (2006.01) |
| *B01J 35/04* | (2006.01) |
| *B01J 35/00* | (2006.01) |
| *B01J 23/652* | (2006.01) |
| *B01J 23/888* | (2006.01) |
| *B01J 21/06* | (2006.01) |
| *B01J 23/30* | (2006.01) |
| *B01J 35/06* | (2006.01) |
| *B01J 35/10* | (2006.01) |

(52) U.S. Cl.
CPC ..... *B01D 53/8612* (2013.01); *B01D 53/8603* (2013.01); *B01D 53/864* (2013.01); *B01D 53/8606* (2013.01); *B01D 53/869* (2013.01); *B01J 21/063* (2013.01); *B01J 23/30* (2013.01); *B01J 23/6527* (2013.01); *B01J 23/888* (2013.01); *B01J 35/0006* (2013.01); *B01J 35/04* (2013.01); *B01J 35/06* (2013.01); *B01D 2255/1023* (2013.01); *B01D 2255/207* (2013.01); *B01D 2255/20723* (2013.01); *B01D 2255/20776* (2013.01); *B01D 2255/904* (2013.01); *B01D 2257/30* (2013.01); *B01D 2257/304* (2013.01); *B01D 2257/306* (2013.01); *B01D 2257/308* (2013.01); *B01D 2257/502* (2013.01); *B01D 2258/0283* (2013.01); *B01J 35/1033* (2013.01)

(58) Field of Classification Search
CPC .. B01D 53/48; B01D 53/485; B01D 53/8603; B01D 53/8606; B01D 53/8612; B01D 2257/30; B01D 2257/304; B01D 2257/306; B01D 2257/308; C01B 17/48; C01B 17/50; C01B 17/501
See application file for complete search history.

(56) References Cited

U.S. PATENT DOCUMENTS

| | | | |
|---|---|---|---|
| 4,148,760 A * | 4/1979 | Sugier | B01D 53/48 502/328 |
| 4,277,458 A | 7/1981 | Sugier et al. | |
| 4,399,112 A | 8/1983 | Voirin | |
| 4,427,576 A | 1/1984 | Dupin | |
| 4,937,058 A | 6/1990 | Dupin et al. | |
| 6,497,855 B1 | 12/2002 | Wachs | |
| 2003/0194366 A1 * | 10/2003 | Srinivas | B01D 53/8612 423/230 |
| 2005/0100495 A1 | 5/2005 | Chapat et al. | |

FOREIGN PATENT DOCUMENTS

| | | |
|---|---|---|
| EP | 0419539 A1 | 4/1991 |
| EP | 2 179 792 A1 | 4/2010 |
| WO | WO 8912025 A1 | 12/1989 |

* cited by examiner

*Primary Examiner* — Timothy Vanoy
(74) *Attorney, Agent, or Firm* — Blank Rome LLP

(57) ABSTRACT

In a broad form the present invention relates to a method for oxidation of a species comprising sulfur in an oxidation state below +4, such as $H_2S$, $CS_2$, COS and $S_8$ vapor, to $SO_2$ said method comprising the step of contacting the gas and an oxidant with a catalytically active material consisting of one or more elements taken from the group consisting of V, W, Ce, Mo, Fe, Ca, Mg, Si, Ti and Al in elemental, oxide, carbide or sulfide form, optionally with the presence of other elements in a concentration below 1 wt %, at a temperature between 180° C. and 290° C., 330° C., 360° C. or 450° C., with the associated benefit of such a temperature being highly energy effective, and the benefit of said elements having a low tendency to form sulfates under the conditions, with the related benefit of an increased stability of the catalytically active material. The other elements present may be catalytically active noble metals or impurities in the listed materials.

13 Claims, No Drawings

CATALYST FOR THE OXIDATION OF SULFUR COMPOUNDS

The invention relates to materials catalytically active in the oxidation of sulfur compounds, more specifically the oxidation of elemental sulfur, H₂S, CS₂, COS, and CO at low temperatures.

H₂S is a common component in off gases from a high number of industries including refineries and viscose fiber production. H₂S may commonly be present together with CS₂, COS and CO especially in waste gases from viscose production. A common method for abatement of sulfides has been the elimination by thermal incineration and by catalytic oxidation involving the following chemical reactions.

$$H_2S + 1.5O_2 \rightarrow SO_2 + H_2O \qquad 1)$$

$$CS_2 + 1.5O_2 \rightarrow COS + SO_2 \qquad 2)$$

$$COS + 1.0O_2 \rightarrow SO_2 + CO \qquad 3)$$

$$CO + 0.5O_2 \rightarrow CO_2 \qquad 4)$$

The thermal incineration is costly, as it requires the addition of a support fuel and incineration at temperatures above 850° C., whereas catalytic oxidation according to the prior art has been in the presence of a material comprising a noble metal typically with the oxidation of H₂S taking place at a temperature above 280° C., and the oxidation of CO in the presence of sulfur requiring even higher temperatures up to 420° C. Catalytic oxidation may thus also require support firing.

Vanadium based catalysts are well known from e.g selective reduction of NO$_x$ (EP 2 179 792) or oxidation of SO₂ to SO₃ (EP 0 419 539). A vanadium based catalyst was also used in a process for the reaction H₂S+CO═COS+H₂; i.e. production of H₂ from H₂S by reduction of CO to COS without changing the oxidation state of sulfur, at 290-330° C. According to U.S. Pat. No. 4,427,576 catalytic activity in the oxidation of 800 ppm H₂S, 100 ppm COS and 500 ppm CS₂ was observed over a catalyst consisting of copper, vanadium, silica and titania at an elevated temperature of 380° C. In other experiments, H₂S oxidation on catalysts comprising copper, long term tests have shown sulfatization of copper to copper sulfate which has reduced stability. In addition U.S. Pat. No. 4,427,576 showed that the combined presence of copper and vanadium in this material decreased the conversion over a material with copper alone.

However, according to the present disclosure a method for the oxidation of hydrogen sulfide over a a catalyst stable against sulfate formation at a temperature as low as 200° C. is provided together with a further variant of said method additionally active in the oxidation of carbon monoxide and carbonyls at temperatures down to 320° C. with the effect of reducing the amount of support fuel required for catalytic oxidation.

The catalytically active materials are based on vanadium and tungsten on a porous support; and in the variant active in carbon monoxide oxidation additionally comprises a noble metal. The material may beneficially be provided on a monolithic substrate with a porous washcoat.

Definitions

The term catalytically active material shall herein be understood a material having the ability to reduce the activation energy of a reaction, compared to the gas phase reaction. Catalytically active material shall not be construed as having a specific physical structure, but rather than that understood as having a capability in a chemical reaction.

A catalytically active material typically consists of an active constituent, which is providing the chemical interaction with the reactants, and a porous support which has the primary function of distributing the active constituent over a high area and typically in many individual clusters. In addition a structural support may also be present with the main function of providing a defined structure with physical stability to the catalytically active material. Furthermore, additional constituents such as stabilizers reducing the sintering or similar deactivation of crystals structures and/or particles of active constituents and further active constituents may be present in the catalytically active material.

A monolithic catalytically active material or a catalyst monolith is a specific physical configuration of a catalyst, in which a structural substrate (with little or no contact with the reacting gas) is covered by a porous support, on which the active material is deposited.

Where reference is made to an unpromoted catalytically active material this shall be understood as a material not comprising promoters of CO oxidation, i.e. palladium or platinum.

Where concentrations are stated in % or vol % this shall be understood as volumetric % (i.e. molar percentages for gases).

Where concentrations are stated in ppm this shall be understood as volumetric parts per million (i.e. molar ppm for gases).

For a structural catalyst the void vol % corresponds to the relative volume accessible by air.

Where concentrations are stated in wt % this shall be understood as weight/weight %.

In a broad form the present invention relates to a method for oxidation of a gas comprising one or more species comprising sulfur in an oxidation state below +4, such as H₂S, CS₂, COS and/or S₈ vapor, to SO₂ said method comprising the step of contacting the gas and an oxidant with a catalytically active material consisting of one or more metal oxides in which the metal is taken from the group consisting Fe, Ca, and Mg, and one or more supports taken from the group consisting of Al₂O₃, SiO₂, SiC, and TiO₂, optionally with the presence of other elements in a concentration below 1 wt %, at a temperature between 180° C. and 290° C., 330° C., 360° C. or 450° C., with the associated benefit of such a temperature being highly energy effective, and the benefit of said elements having a low tendency to form sulfates under the conditions, with the related benefit of an increased stability of the catalytically active material. The other elements present may be catalytically active noble metals or impurities in the listed materials.

In a further embodiment, said catalytically active material comprises from 1 wt %, 2 wt % or 3 wt % to 4 wt %, 5 wt %, 10 wt %, 25 wt % or 50 wt % V₂O₅, with the associated benefit of balancing low cost at low concentrations and high activity at low temperatures at higher concentrations.

In a further embodiment the catalytically active material or the porous support comprises TiO₂ preferably in the form anatase with the associated benefit of TiO₂ and especially anatase being highly porous and thus active as catalyst supports.

In a further embodiment the porous support comprises SiO₂ preferably being in the form of diatomaceous earth or a highly porous artificial silica with the associated benefit of SiO₂ and especially diatomaceous earth and highly porous artificial silica being highly porous, and thus active as catalyst supports.

In a further embodiment the catalytically active material further comprises a stabilizing constituent, preferably WO₃, with the associated benefit of stabilizing the active crystal structure such as the vanadium/anatase structure thus giving a longer life time of the catalytically active material.

In a further embodiment the catalytically active material comprises from 2 wt % or 3 wt % to 5 wt %, 10 wt % or 50 wt % $WO_3$, with the associated benefit of balancing high stabilization with high concentrations and reduced cost when using lower concentrations of $WO_3$.

In a further embodiment the catalytically active material is in the form of a monolithic catalyst, preferably comprising a structural substrate made from metal, high silicon glass fibres, glass paper, cordierite and silicon carbide and a catalytic layer with the associated benefit of providing a stable and well defined physical shape.

In a further embodiment the monolithic catalyst has a void of from 65 vol % or 70 vol % to 70 vol % or 80 vol %, with the associated benefit of a good balance between the amount of catalytic material and an open monolith with low pressure drop.

In a further embodiment the catalytic layer of said monolithic catalyst has a thickness of 10-150 µm with the associated benefit of providing a catalytically active material with high pore volume.

In a further embodiment the catalyst further comprises from 0.01 wt %, 0.02 wt % or 0.05 wt % to 1 wt % of a noble metal, preferably Pd or Pt, with the associated benefit of noble metals, and especially Pd and Pt being catalytically active in the oxidation of CO and COS.

A further aspect of the present disclosure relates to a method for the oxidation of a gas comprising one or more species comprising sulfur in an oxidation state below +4, such as $H_2S$, $CS_2$, COS and/or $S_8$ vapor to $SO_2$ said method comprising the step of contacting the gas and an oxidant with such a catalyst at a temperature between 180° C. and 450° C., with the associated benefit of such a method requiring a lower temperature of the feed gas, compared to similar processes with traditional catalysts.

In a further embodiment the oxidant is $O_2$ and said oxidant is present in at least the stoichiometric amount for oxidation of sulfur containing compounds to $SO_2$, with the associated benefit of providing substantially all sulfur in an oxidated form convertible to e.g. sulfuric acid by well-known processes.

Vanadium is known as a material catalytically active in oxidation, but it has not been applied at high concentration for the oxidation of sulfur compounds to sulfur dioxide. In the present context the concentration of vanadium oxide in the catalytic material is above 1 wt % or 2 wt %.

The high activity of catalytically active vanadium requires that vanadium is well distributed on a porous support. This support may according to the present disclosure preferably comprise titania ($TiO_2$) possibly in combination with silica ($SiO_2$), and preferably in highly porous forms. For titania, anatase is the preferred form, and silica is preferably provided as diatomaceous earth or artificial high porosity silica.

The structure of vanadium and titania may be stabilized by an appropriate stabilizer. A preferred stabilizer is tungstenate $WO_3$, but other materials are also known to the skilled person.

Without being bound by theory, specifically vanadium provides high catalytic activity and is stabilized and/or promoted by combination with the presence of tungsten, cerium and molybdenum, which share the benefit of a low tendency to form sulfates from $SO_3$ produced oxidation of sulfur, contrary to e.g. Cu or Mn (see e.g. J. Phys. Chem, 95,4051-4058 (1991)). The absence of sulfates results in an increased physical stability of the catalytically active material.

To enable the oxidation of carbonyls and carbon monoxide at low temperatures noble metal is required. Preferred noble metals are palladium and platinum. These materials are only required to be present in concentrations between 0.05 wt % and 1 wt %.

To ensure a low pressure drop the catalytically active material may be provided on a monolithic support. As it is known to the person skilled in the art, many variants of monolithic support exist. These are predominantly chosen as inert materials according to their mechanical and production characteristics. Some examples are metal grids, high silicon glass fibres, glass paper, cordierite and silicon carbide.

High silicon content glass may contain 94-95% by weight $SiO_2$, 4-5% by weight $Al_2O_3$ and some $Na_2O$, these fibres have a density of 2000-2200 g/l with a fibre diameter is 8-10 µm. An example is the commercially available SILEX staple fiber.

E-glass (electrical grade glass fibre) may contain 52-56% by weight $SiO_2$, 12-16% by weight $Al_2O_3$, 5-10% by weight $B_2O_3$, 0-1.5% by weight $TiO_2$, 0-5% by weight MgO, 16-25% by weight CaO, 0-2% by weight $K_2O/Na_2O$ and 0-0.8% by weight $Fe_2O_3$.

The catalytic material may be applied on a monolithic substrate, which may have the form of plane or corrugated plates. The monolithic substrate comprises a structural substrate such as sheets of E-glass fibres, sheets of a glass with high silicon content, cordierite or silicon carbide and a porous layer comprising $TiO_2$ and/or $SiO_2$. The porous layer may be applied by dipping the structural substrate in an appropriate slurry. Solvents for said slurries may be water or a mixture of organic solvents (alcohols, alifatic or aromatic solvents) depending on the binder solubility. Binders may be soluble in water (e.g. PVA, PEG) or organic solvents (e.g. PVP, resins) and serve as rheology modifiers as well as binders after evaporation of solvents. Alternatively low viscosity slurries may be shaped to catalyst supports by dip-coating of a pre-shaped structure, i.e. a pre-wash-coated structure. Concentrated slurries or pastes may be shaped to catalyst support by extrusion or calendering into metal wire mesh or glass fibre paper.

EXAMPLE 1

900 g anatase $TiO_2$ powder was suspended in 1100 g of a solution of tetra-isopropyl-titanate in butanol containing 4% by weight of Ti and 4% by weight of water. This slurry was mixed thoroughly in a laboratory dissolver in order to secure intimate mixture of the constituents and to break down any agglomerate to be smaller than 400 mesh. An Erichsen Grindometer was used to control this. Glass fibre mats having a thickness of approximately 1 mm were cut to dimensions of approximately 18 by 5 cm. These mats were dipped into the above mentioned slurry to obtain a fully wetted fibre mat. After drying, the material was calcined at 600° C. for 2 hours.

After calcination, the catalyst support material was impregnated with solutions made from $NH_4VO_3$ and $(NH_4)_6H_2W_{12}O_{40}$ and treated at 400° C. in air to give a final catalyst containing 3 wt % $V_2O_5$ and 3 wt % $WO_3$, having a void of approximately 75%.

EXAMPLE 2

The catalyst produced according to Example 1 was further impregnated with palladium by suspension in a solution of palladium tetra-ammine bicarbonate in nitric acid. The resulting Pd concentration was approximately 0.35 wt %.

EXAMPLE 3

The unpromoted catalyst prepared according to Example 1 was tested for the oxidation of hydrogen sulfide, $H_2S$.

A stream of 380 ppm $H_2S$, and 2.9% $O_2$ was directed to contact the unpromoted catalyst at temperatures from 172° C. to 212° C. in an oven, with a NHSV of 8600 Nm3/h/m³. To simplify the evaluation, the relative amount of $H_2S$ found as $SO_2$ in the product gas is tabulated.

Table 1 shows the results of these examples, according to which the ignition temperature for oxidation of $H_2S$ to $SO_2$ was found to be around 180° C.

TABLE 1

| Temperature [° C.] | S oxidation to $SO_2$ |
| --- | --- |
| 172 | 55% |
| 177 | 82% |
| 182 | 97% |
| 192 | 100% |
| 212 | 100% |

EXAMPLE 3

The Pd promoted catalyst produced according to Example 2, was tested for the oxidation of carbon disulfide, $CS_2$, which produces CO as an intermediate product.

A stream of 904 ppm $CS_2$, 1769 ppm $SO_2$, 2.3% $H_2O$ and 17% $O_2$ was directed to contact the Pd-promoted catalyst at temperatures from 260° C. to 320° C. in an oven with a NHSV of 8800 Nm3/h/m³.

Under similar conditions the unpromoted catalyst according to Experiment 1 showed a good sulfur oxidation activity, but insufficient carbon monoxide and carbonyl oxidation activity below 400° C.

In Table 2 the experimental results are shown. At 315° C. full oxidation of $CS_2$ to $CO_2$ and $SO_2$ occurs. At lower temperatures some indication of deactivation with respect to CO oxidation was observed but this deactivation was reversible.

TABLE 2

| | Promoted catalyst | |
| --- | --- | --- |
| Temperature [° C.] | S oxidation to $SO_2$ | C oxidation to $CO_2$ |
| 262 | <70% | <65% |
| 291 | <80% | <90% |
| 315 | 100% | 100% |

The invention claimed is:

1. A method for the oxidation of a gas comprising one or more sulfur species having an oxidation state below +4, and selected from $H_2S$, $CS_2$, COS and $S_8$ vapor to $SO_2$, said method comprising contacting the gas and an oxidant with a catalytically active material consisting of one or more metal oxides in which the metal is taken from the group consisting of V, W, Ce, Mo, Fe, Ca, and Mg, and one or more supports taken from the group consisting of $Al_2O_3$, $SiO_2$, SiC and $TiO_2$, and a stabilizing constituent comprising $WO_3$, optionally in the presence of other elements in a concentration below 1 wt %, at a temperature between 180° C. and 450° C.

2. A method according to claim 1 in which said catalytically active material comprises from 1 wt % to 50 wt % $V_2O_5$.

3. A method according to claim 2 comprising above 2 wt % to 50 wt % $V_2O_5$.

4. A method according to claim 1, in which the porous support comprises $TiO_2$.

5. A method according to claim 1, in which the support comprises $SiO_2$ as a diatomaceous earth or a highly porous artificial silica.

6. A method according to claim 1, in which said stabilizing constituent comprises from 2 wt % to 50 wt %.

7. A method according to claim 1, in which said catalytically active material comprises a monolithic catalyst substrate comprising one of metal, high silicon glass fibres, glass paper, cordierite and silicon carbide, and a catalyst layer.

8. A method according to claim 7, wherein the monolithic catalyst has a void volume of from 65 vol to % 80 vol %.

9. A method according to claim 7, wherein the catalyst layer has a thickness of 10-150 μm.

10. A method to claim 1, in which said catalytically active material further comprises from 0.01 wt % to 1 wt % of a noble metal.

11. A method to claim 10, in which said noble metal comprises from 0.05 wt % to 1 wt % of one of Pd and Pt.

12. A method according to claim 1 in which the oxidant is $O_2$ and is present in at least a stoichiometric amount for oxidation of said sulfur containing compounds to $SO_2$.

13. A method for oxidation of a gas comprising one or more sulfur species selected from $H_2S$, $CS_2$, COS and/or $S_8$ vapor, comprising contacting the gas, an oxidant with a supported catalytically active material at a temperature from 180° C. to 450° C., said catalytically active material consisting of one or more oxides of a metal selected from the group consisting of V, W, Ce, Mo, Fe, Ca, and Mg, and one or more supports taken from the group consisting of $Al_2O_3$, $SiO_2$, SiC and $TiO_2$, said supported catalytically active material further including from 3 wt. % to 50 wt. % of a stabilizing constituent and, optionally less than 1 wt % of other elements, to convert said sulfur species to $SO_2$.

* * * * *